Figures 1, 2:
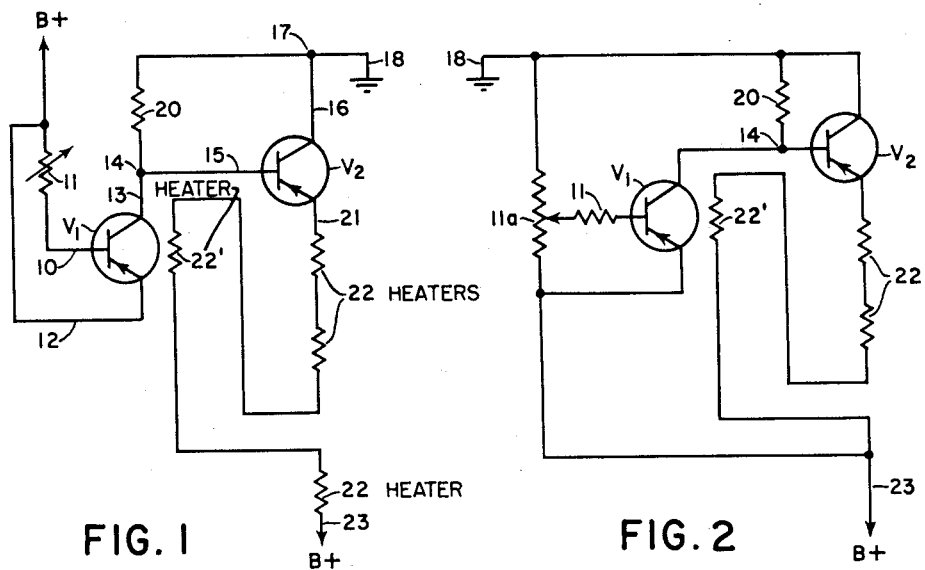

United States Patent Office 2,932,714
Patented Apr. 12, 1960

2,932,714

TRANSISTOR TEMPERATURE REGULATOR

John B. Merrill, Rochester, N.Y., assignor to General Dynamics Corporation, Rochester, N.Y., a corporation of Delaware Application February 14, 1957, Serial No. 640,264

6 Claims. (Cl. 219—20)

This invention relates to a temperature regulator.

The need for temperature regulation in transistor circuits is known. For example, the exponential variation of the zero-emitter collector current, $I_{co}$, with temperature is a recognized phenomenon. To control the variation of this and other transistor parameters, it is recognized as desirable to maintain the temperatures of the transistors in a circuit at or above some minimum temperature value, such as, for example, 25° C. Because of the localized nature of temperature control required, control over the ambient atmospheric temperature is often insufficient as a practical solution.

Attempts have been made to avoid the need for temperature regulation by designing transistor circuits to compensate automatically for temperature changes. The current direction method of stabilization is exemplary of this approach. This and other compensatory techniques have been found unsatisfactory for a number of reasons, among which may be mentioned the requirement for the use of transistors of particular characteristics in each stage or location in the circuit.

The use of conventional temperature control devices such as bimetallic strips, mercury contacts, and devices operated by gas pressure, to sense and control temperatures locally, is cumbersome and unsatisfactory. These devices perform their function by opening and closing, successively, a physical electrical contact. These contacts are mechanical and since they are susceptible to vibration and shock damage, and to breakdown from wear, they invariably cause trouble.

A primary object of the present invention is to provide a transistor circuit that can be used to regulate the temperature of other transistors to maintain their temperature at or above a minimum value.

Another object of the invention is to provide a simple transistor circuit that can be employed to sense and regulate temperature, and that may be used in place of a conventional thermostat.

A further object of the invention is to provide a temperature regulator that is substantially immune to damage from vibration and that does not deteriorate because of mechanical wear.

Still another object of the invention is to provide a temperature regulating device having a transistor circuit whose performance is not altered materially by variations in the characteristics of replacement transistors.

Yet another object of the invention is to provide a temperature regulator that operates continuously to produce a regulating electrical control current that varies continuously and directly with changes in the temperature.

Other objects of the invention will become obvious to those skilled in the art from consideration of the following detailed description of the invention and from a consideration of the drawing that shows a specific embodiment thereof.

In the illustrated embodiment of the invention, the circuit consists of a pair of PNP transistors connected in tandem. The base electrode of the first transistor is connected through a resistor to a source of constant, positive D.C. potential, designated hereafter as B+, and the emitter electrode is directly connected to B+, so that the emitter is positively biased relative to the base by a predetermined amount. The collector electrode of the first transistor is directly connected with the base electrode of the second transistor. The emitter of the second transistor is series-connected through several separate heater coils with B+, and one of these heater coils is mounted to dissipate its heat adjacent the first transistor. The collector of the second transistor is connected directly to ground, a source of zero reference potential.

The principle of operation of this type of regulator circuit is that the temperature of the first transistor is caused to vary directly with the current flowing in the emitter electrode of the second transistor, by dissipation of heat from the heater coil that is located adjacent the first transistor and that is series-connected with the emitter electrode of the second transistor. When the temperature of the first transistor is raised, its $I_{co}$ increases, and its collector voltage becomes more positive. This makes the base voltage of the second transistor more positive, so that the heater current flowing in its emitter decreases. This in turn reduces the temperature of the first transistor and its $I_{co}$. An equilibrium is soon reached. The value of equilibrium temperature may be adjusted with the bias on the first transistor; in this case, the bias can be regulated by adjusting the value of the resistance between the base of the first transistor and B+.

When the other heater coils are disposed adjacent other transistors in other circuits, this regulator circuit can be used to maintain the temperature of these other transistors at any selected value, through control of the temperature of the first transistor in the regulator circuit.

Figure 3:
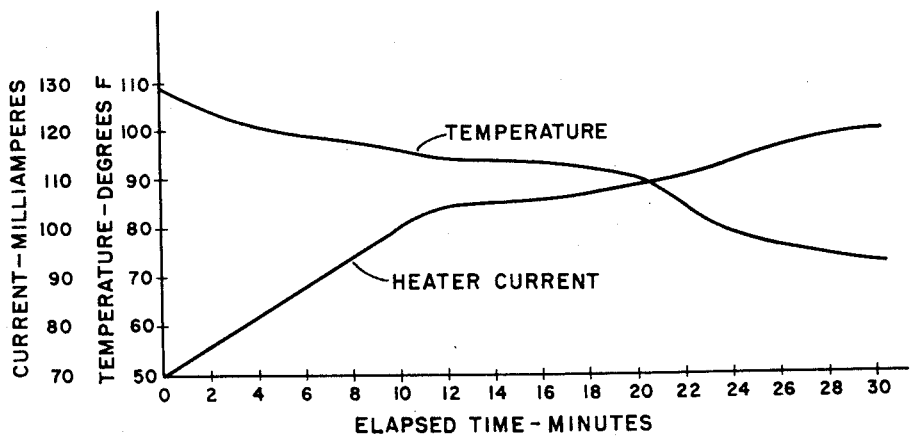

The invention will be most readily understood from a consideration of the following detailed description of preferred embodiments that are illustrated in the accompanying drawing in which:

Figures 1 and 2 are each circuit diagrams of the preferred embodiments of the invention, and Figure 3 is a graph showing heater current as a function of temperature.

Referring now to Figure 1, there is shown a transistor circuit particularly adapted for use as a temperature regulation device. The circuit includes two PNP transistors, $V_1$ and $V_2$. The base electrode of $V_1$ is series-connected through a line 10 and a resistor 11 to a source of constant, positive D.C. potential, B+. The emitter electrode of $V_1$ is directly connected through a line 12 to B+. In this way, a predetermined positive bias is applied to the emitter relative to the base electrode. The magnitude of this bias voltage is determined by the value of the resistor 11 for a given constant magnitude B+ voltage.

The collector electrode of $V_1$ is connected through a line 13 to a terminal 14; and a line 15 connects the terminal 14 to the base electrode of $V_2$. A line 16 connects the collector electrode of $V_2$ with a terminal 17. A resistor 20 is connected between the two terminals 14, 17. The terminal 17 is also connected by a line 18 to a source of zero reference potential, to ground the collector electrode of $V_2$. The negative terminal of the source of positive D.C. potential B+ may also be connected to ground (not shown).

The emitter electrode of $V_2$ is series-connected to B+ through a line 21, a plurality of heater coils 22, and the line 23. There are four heater coils in the system illustrated. One of these heater coils, designated at 22', is disposed adjacent the shell of $V_1$.

When the several heater coils are equal to one another in resistance, each generates the same amount of heat. Then, each coil may be mounted in a standardized manner, adjacent or within the shell of a transistor where it is desired to maintain the transistor temperatures at or above some minimum value, such as 25° C.

The regulator circuit operates to maintain the desired minimum temperature, say 25° C., in the following manner: Assume that initially the ambient temperature is below the desired minimum temperature value; $I_{co}$ for $V_1$ is then negligible, the base-emitter voltage in $V_1$ is zero, and $V_1$ is cutoff. $V_1$ collector voltage is zero, as is the base voltage of $V_2$. Since the emitter of $V_2$ is connected through line 21, the heater coils 22, and line 23 to B+, and since the collector of $V_2$ is grounded through lines 16 and 18, the conduction of $V_2$ is at a maximum, and the heater power is also at a maximum. As the heater 22' for $V_1$ begins to raise the temperature of $V_1$, the $I_{co}$ for $V_1$ increases. This makes the collector voltage of $V_1$ more positive, and since the collector of $V_1$ is connected through lines 13 and 15 with the base electrode of $V_2$, this in turn reduces the heater current flowing in the emitter of $V_2$. An equilibrium condition is soon reached. The value of the equilibrium temperature depends upon the bias on $V_1$, as determined in this circuit by the value of the resistor 11. By adjusting the value of the resistor 11, the value of the equilibrium temperature can be selected.

Figure 2 shows an alternative circuit for adjusting the equilibrium temperature of the heated transistor. The potentiometer 11a is connected across the B+ supply as shown and the base of transistor $V_1$ is connected through resistor 11 to the sliding contact of the potentiometer. The remainder of the circuit of Figure 2 is essentially the same as in Figure 1.

Since the heater coils 22 are equal in resistance, each releases the same amount of heat. Therefore, the temperature of each other transistor (not shown) whose temperature is controlled by a heater coil of this illustrated circuit, other conditions being equal, should be the same as the temperature of $V_1$. In this way, a plurality of transistors can be temperature-regulated by the circuit shown. The resistor 11 can be a variable resistance, if desired, for convenience in adjusting the temperature value.

The number of heater coils that can be employed is limited only by the capacity of the circuit, and the specific number in the drawing is shown for the purpose of illustrating the invention only; a greater or lesser number of coils may be employed if desired. Similarly, in the illustrated circuit the heater coils are identical, but coils of differing resistances may be employed if desired for any specific purpose. For example, for the regulation of specific circuits, heaters of differing capacities may be required for different transistors, to compensate, for example, for different current loads on the transistors. Moreover, while the emitter current of $V_2$ is employed here to regulate the temperature of $V_1$ and other transistors (not shown), it will be understood that this current, except that required to develop heat to control the temperature of $V_1$, may be employed for the continuous control of any other device desired. Since the emitter current is continuously responsive to changes in the temperature of $V_1$ caused by changes in the ambient temperature, continuous control is possible, in contrast to the intermittent control obtained where devices are employed that operate through physical electrical contacts. Similarly, other tandem connections than that shown may be employed, if desired, and the current of other electrodes may be employed to power the heater coils.

The large internal gain of this electrical-thermal feedback system reduces the effect of variations in any replacement transistors that may be substituted for $V_1$ or $V_2$ during the life of the device. The circuit shown has the advantage of vibration immunity and freedom from mechanical wear.

In one practical test, the temperature of the transistors of the circuit of Figure 2 was varied over a range from about 110° F. to 70° F., and the current in the heating circuit, including the common emitter, was measured and plotted, as in Figure 3. It is observed that the heater current responded immediately to slow or rapid changes in temperature. In this particular test and circuit, the transistors used were commercially obtainable "Philco AR6" types, commonly used for audio power output service and capable of delivering about 5 watts of power to the heating circuit. Whether or not this much power is sufficient to stabilize the temperature in a given space containing the transistors depends, of course, on the size of the space and on the insulation around and flow of heat from the space. A well insulated box or chassis could be quite large, and the heating current input for stabilizing the temperature quite small.

For ovens, or living space, where large heating power is required, the transistor output may be employed to control suitable power amplifiers. As shown in Figure 3, the temperature-current sensitivity of the transistor-thermostat is good. Over the range tested, Figure 3, the heater current in the specific circuits shown varied 1.32 milliamperes per degree Fahrenheit change of temperature.

The foregoing description has related to a preferred embodiment of the invention in which PNP transistors were employed. It should be understood, however, that NPN transistors may be used equally well, except that all polarities would be reversed.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention what I claim is:

1. A circuit comprising a pair of transistors each having a base, a collector, and an emitter, means for applying a predetermined biasing voltage to the emitter and base of a first of said transistors, means connecting the collector of said first transistor to the base of the second of said transistors for applying a biasing voltage thereto, means for applying a predetermined biasing voltage to the collector and emitter of said second transistor, means to generate heat in proportion to the emitter current of said second transistor, and means to apply at least a portion of said heat to control the temperature of said first transistor thereby to control the biasing voltage applied to the base of said second transistor.

2. A temperature-regulatable heating device comprising a pair of transistors each having a base, a collector, and an emitter, means for applying a predetermined biasing voltage to the emitter and base of a first of said transistors, means connecting the collector of said first transistor to the base of the second of said transistors for applying a biasing voltage thereto, means for applying a predetermined biasing voltage to the collector and emitter of said second transistor, means including a resistance connecting the collector of said second transistor to the base thereof, means to generate heat in proportion to the emitter current of said second transistor, and means to apply at least a portion of said heat to control the temperature of said first transistor thereby to control the biasing voltage applied to the base of said second transistor.

3. A circuit comprising a pair of transistors having temperature variable parameters and each having a base, a collector, and an emitter, means for applying an adjustable biasing voltage across two of the electrodes of a first of said transistors, means coupling the other electrode of said first transistor to one electrode of the second of said transistors for controlling the current in said second transistor, an electric circuit, means electrically connecting said second transistor in said circuit for controlling the current in said circuit, said circuit including means for applying a voltage across electrodes of said second transistor, said circuit also including means to generate heat in proportion to the current flow in said circuit and to apply at least a portion of said generated heat to control the operating temperature of said first transistor.

4. A circuit comprising a pair of transistors having temperature variable parameters and each having a base, a collector, and an emitter, means for applying an adjustable biasing voltage across the emitter and base of a first of said transistors, means connecting the collector of said first transistor to the base of the second transistor for controlling the current therein, an electric circuit, means electrically connecting said second transistor in said circuit for controlling the current therein, said circuit including electrical resistance means to generate heat in proportion to the current flow in said circuit and to apply at least a portion of the generated heat to control the operating temperature of said first transistor.

5. An electrical-thermal feedback system comprising a pair of transistors each having a base, a collector, and an emitter, means for applying an adjustable biasing voltage across the emitter and base of a first of said transistors, means connecting the collector of said first transistor to the base of the second of said transistors for applying a biasing voltage thereto and controlling the current flow therein, an electrical circuit, means electrically connecting said second transistor in said circuit for controlling the current therein, said circuit including means for applying a voltage across the collector and emitter of said second transistor, means including an impedance connecting the collector of said second transistor to the base thereof, means to generate heat in proportion to the current flow in said circuit, and means to apply at least a portion of said generated heat to control the operating temperature of said first transistor.

6. An electrical-thermal feedback system comprising a pair of PNP transistors having temperature-variable parameters and each having a base, a collector, and an emitter, means for biasing the emitter of a first of said transistors positively and adjustably relative to the base thereof, means connecting the collector of said first transistor to the base of the second transistor for applying a biasing voltage thereto and controlling the current therein, an electric circuit, means electrically connecting said second transistor in said circuit for controlling the current in said circuit, said circuit including means for biasing the emitter of said second transistor positively, and resistance heater means in said circuit whose heat dissipation is responsive to the current flow in said circuit, at least some of said resistance heater means being disposed to apply at least a portion of the dissipated heat to the first transistor to control the temperature thereof thereby to control the temperature variable parameter of said first transistor.

References Cited in the file of this patent
UNITED STATES PATENTS

| | | |
|---|---|---|
| 2,604,496 | Hunter | July 22, 1952 |
| 2,725,317 | Kleimack | Nov. 29, 1955 |
| 2,757,243 | Thomas | July 31, 1956 |
| 2,767,330 | Marshall | Oct. 16, 1956 |
| 2,802,071 | Lin | Aug. 6, 1956 |
| 2,806,200 | Ketchledge | Sept. 10, 1957 |
| 2,808,471 | Poucel et al. | Oct. 1, 1957 |